US009784338B1

(12) United States Patent
Parrett et al.

(10) Patent No.: US 9,784,338 B1
(45) Date of Patent: Oct. 10, 2017

(54) ADAPTER SECURITY KEYCHAIN

(71) Applicant: WESCO Distribution, Inc., Pittsburgh, PA (US)

(72) Inventors: Ralph E. Parrett, Colorado Springs, CO (US); Seth Anderson, Denver, CO (US)

(73) Assignee: WESCO Distribution, Inc., Pittsburgh, PA (US)

( * ) Notice: Subject to any disclaimer, the term of this patent is extended or adjusted under 35 U.S.C. 154(b) by 110 days.

(21) Appl. No.: 14/470,147

(22) Filed: Aug. 27, 2014

Related U.S. Application Data

(60) Provisional application No. 61/870,882, filed on Aug. 28, 2013.

(51) Int. Cl.

| | |
|---|---|
| ***H01R 13/60*** | (2006.01) |
| ***F16G 11/10*** | (2006.01) |
| *H01R 13/72* | (2006.01) |
| *F21V 21/088* | (2006.01) |
| *F21V 23/06* | (2006.01) |
| *F21V 21/38* | (2006.01) |
| *F21V 17/10* | (2006.01) |
| *H01R 13/506* | (2006.01) |
| *F21V 21/008* | (2006.01) |

(52) U.S. Cl.

CPC .............. *F16G 11/10* (2013.01); *F21V 17/10* (2013.01); *F21V 21/008* (2013.01); *F21V 21/088* (2013.01); *F21V 21/38* (2013.01); *F21V 23/06* (2013.01); *H01R 13/506* (2013.01); *H01R 13/72* (2013.01)

(58) Field of Classification Search

CPC ........ F21V 23/06; F21V 21/088; F21V 21/38; F21V 17/10; F21V 21/008; F16G 11/10; H01R 13/72; H01R 13/506

USPC ................................ 439/172, 528, 518, 638

See application file for complete search history.

(56) References Cited

U.S. PATENT DOCUMENTS

| | | | | |
|---|---|---|---|---|
| 5,581,850 A * | 12/1996 | Acker | F16L 3/23 | 24/16 PB |
| 7,275,941 B1 * | 10/2007 | Bushby | H01R 13/6397 | 439/133 |
| 8,758,045 B2 * | 6/2014 | McSweyn | H01R 13/60 | 439/501 |
| 2008/0194149 A1 * | 8/2008 | Kim | H01R 27/02 | 439/639 |
| 2012/0309230 A1 * | 12/2012 | Watanabe | H01R 31/06 | 439/620.21 |

* cited by examiner

*Primary Examiner* — Abdullah Riyami
*Assistant Examiner* — Justin Kratt
(74) *Attorney, Agent, or Firm* — Renner, Kenner, Greive, Bobak, Taylor & Weber

(57) ABSTRACT

A adapter security system adapted to be attached to a cable is taught. The adapter security system includes a wire, at least one adapter that is carried by the wire, and a clamping assembly that is adapted to attach the wire to the cable. The adapter security system provides a means of securing adapters at the location of a presentation while also providing convenient access for the user to the adapters.

19 Claims, 4 Drawing Sheets

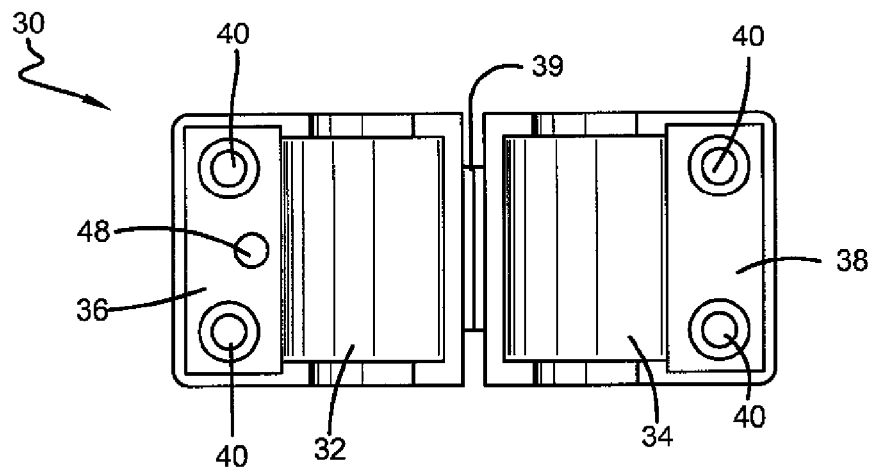
FIG. 3A
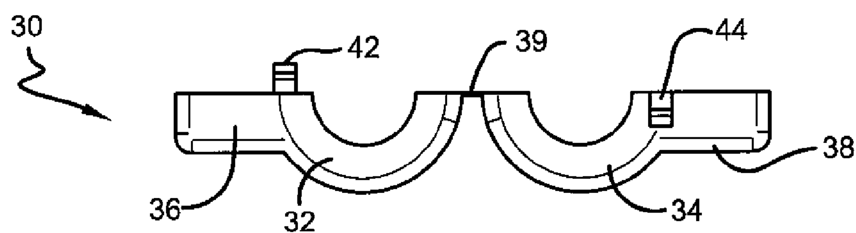
FIG. 3B
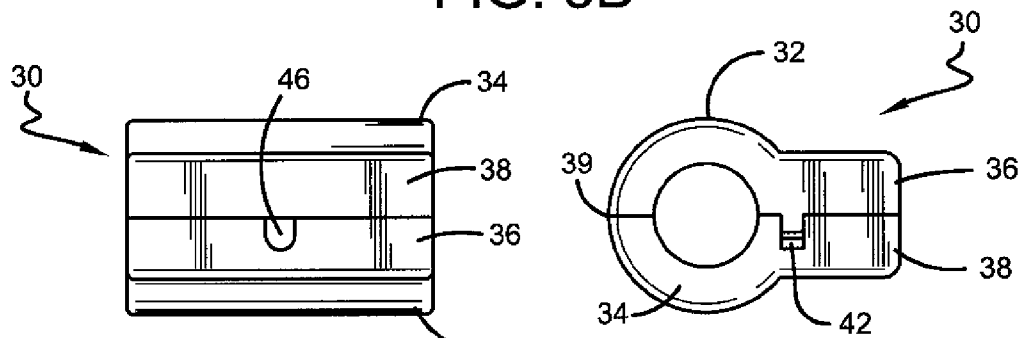
FIG. 3C
FIG. 3D
50
52
FIG. 4A
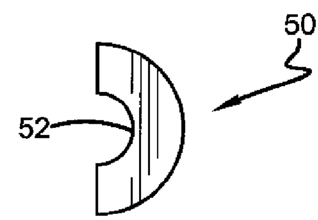
FIG. 4B

ADAPTER SECURITY KEYCHAIN

CROSS-REFERENCE TO RELATED APPLICATION

This application claims the benefit of U.S. provisional patent application Ser. No. 61/870,882 entitled "Digital Adapter Security Keychain," filed Aug. 28, 2013, and incorporated by reference in its entirety.

FIELD OF THE INVENTION

The present invention generally relates to a security system for electronic adapters and dongles. More particularly, this invention relates to a security ring assembly which keeps electronic adapters and dongles in place at the point of presentation so that such adapters and dangles cannot be misplaced or stolen.

BACKGROUND OF THE INVENTION

In today's digital world there are many different mobile content devices such as laptops, ultra books, tablet computers, and smart phones which are used every day to present information to others. Usually presenters will bring their own device to a presentation and then have to connect it to a larger monitor or projection screen before they begin their presentation. Each mobile content device requires the use of a different adapter to connect the device to the larger monitor or screen. These adapters are small, and they tend to be easily misplaced, lost or stolen.

Thus, there is a need to keep a multitude of different adapters secure and on hand at the point of a presentation. One attempted solution to this problem is the use of what is known as a "Hydra Cable System." A Hydra Cable System is a system which employs a cable having multiple adapter ends attached at the end of the cable. The multiple adapter ends of the cable are configured to have a single output and therefore the user must push a button on the cable to determine and select which input is active. However, this cable has the same issues as individual adapters in that it is easily misplaced, lost or stolen. Thus, the need exists for a means of securing digital adapters at the location of a presentation while also providing convenient access for the user to the digital adapters.

DISCLOSURE OF THE INVENTION

Therefore, it is an object of one aspect of the present invention to provide a system which reduces the chances that a digital adapter can be misplaced, lost, or stolen.

It is object of another aspect of the present invention to provide a system, as above, which secures digital adapters at the location of a presentation while also providing convenient access for the user to the digital adapters.

These and other objects of the present invention, as well as the advantages thereof over existing prior art forms, which will become apparent from the description to follow, are accomplished by the improvements hereinafter described and claimed.

In general, a adapter security system made in accordance with the present invention is adapted to be attached to a cable and includes a wire, at least one digital adapter carried by the wire, and a clamping assembly adapted to attach the wire to the cable.

In accordance with another aspect of the invention, a method of securing digital adapters to a cable at a workstation is provided and includes the steps of attaching at least one digital adapter onto a wire, attaching a clamping assembly onto the wire, placing the cable from the workstation within the confines of the clamping assembly, and closing the clamping assembly to retain the cable.

A preferred exemplary adapter security system according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 3A is a top plan view of the clamping assembly of the present invention in an open position;

FIG. 3B is a side elevational view of the clamping assembly of FIG. 3A;

FIG. 3C is an end elevational view of the clamping assembly of FIG. 3A in the closed position;

FIG. 3D is a side elevational view of the clamping assembly of FIG. 3A in a closed position;

FIG. 4A is a top plan view of a rubber insert which can be used with the present invention;

FIG. 4B is an end elevational view of the rubber insert of FIG. 4A;

PREFERRED EMBODIMENTS FOR CARRYING OUT THE INVENTION

Figure 1:
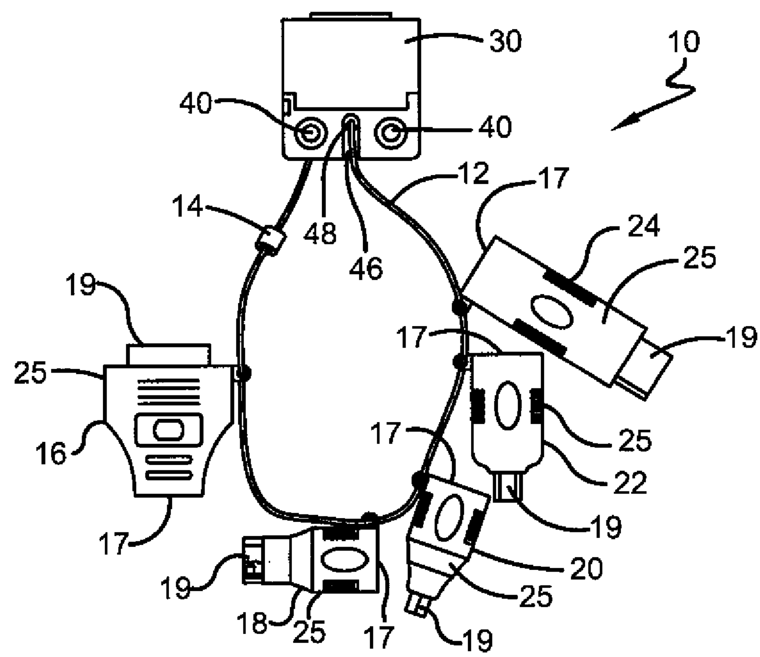
FIG. 1 is a somewhat schematic elevational view of the adapter security system of the present invention.
Figure 2:
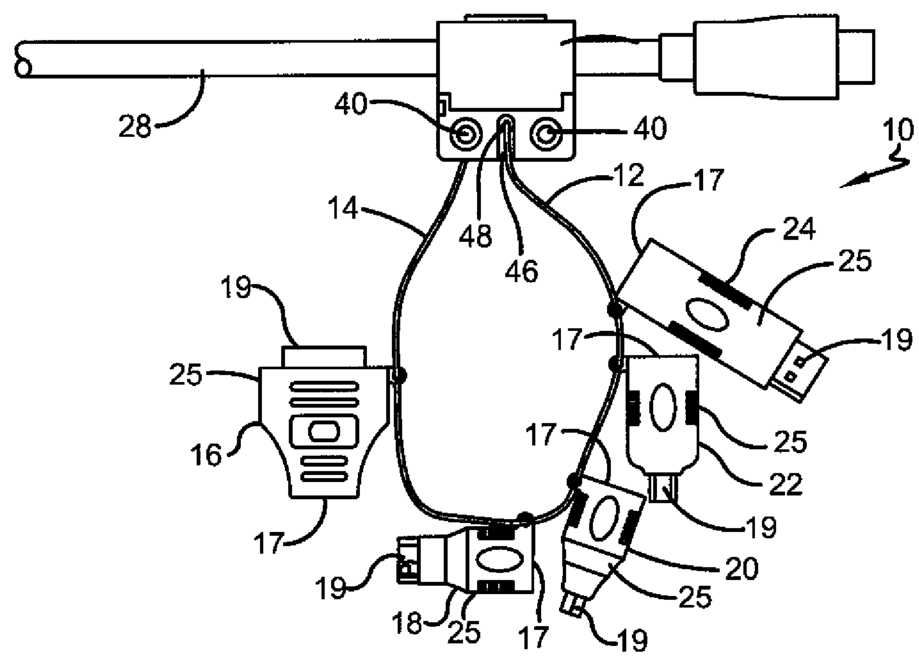
FIG. 2 is a somewhat schematic elevational view of the adapter security system of FIG. 1 shows it attached to a cable.

A adapter security keychain made in accordance with the present invention is indicated generally by the numeral 10 and is shown in FIGS. 1 and 2. The adapter security keychain 10 includes a security wire 12, a retaining ring 14, a plurality of adapters 16, 18, 20, 22, and 24 carried by the security wire 12, and a clamping assembly 30 carried by the security wire 12.

FIG. 1 shows the adapter security keychain 10 not attached to a cable, whereas FIG. 2 shows the adapter security keychain 10 attached to an HDMI cable 28. An installer can add and remove adapters as needed, and once all needed adapters and the clamping assembly 30 is added, the installer will close the security wire 12 by means of the retaining ring 14. The retaining ring 14 is shown in FIG. 1 as being outside the clamping assembly 30, however, when the clamping assembly 30 is locked, the retaining ring 14 can be positioned inside the clamping assembly 30 for added security, as shown in FIG. 2. If a user of the adapter security keychain 10 wishes to add additional adapters once the clamping assembly 30 has been locked, an installer has the ability to unlock the clamping assembly 30, open the security wire 12, and thread new adapters onto the security wire 12 as needed. Once the new adapters are added, the installer will then again go about closing the security wire 12 by means of the retaining ring 14 and finally locking the clamping assembly 30.

FIG. 3A, FIG. 3B, FIG. 3C, and FIG. 3D show the clamping assembly 30 of the security adapter keychain 10. The clamping assembly 30 includes a left and right opposed clamping chambers 32 and 34, a left and right locking end 36 and 38 extending from chambers 32 and 34, respectively, a hinge 39 connecting chambers 32 and 34, and four screw apertures 40 on the locking ends 36 and 38. As shown in FIG. 3B and FIG. 3D, the left locking end 36 contains a locking lug 42 and the right locking end 38 contains a locking groove 44. As shown in FIG. 3A and FIG. 3C, the left locking end 36 also contains two security wire apertures 46 and 48. The connecting hinge 39 connects the left and right clamping chambers 32 and 34 and, when in use, the right clamping chamber 34 rotates at the connecting hinge 39 to clamp over the HDMI cable 28 and to connect to the left clamping chamber 32.

As shown in FIG. 1 and FIG. 2, the security wire 12 extends through security wire apertures 46 and 48 of the clamping assembly 30 so as to attach the clamping assembly 30 to the security wire 12. The clamping assembly 30 is secured to the HDMI cable 28 with two sets of pin drive screws and associated nuts (screws and nuts not shown) through the four screw apertures 40 on the locking ends 36 and 38 of the clamping assembly 30, as shown in FIG. 2. When in use, the HDMI cable 28 will plug into the female end of whichever adapter 16-24 that is needed, and then the male end of the chosen adapter will be plugged into whichever mobile content device (mobile content devices not shown) is being used. The clamping assembly 30 can be made from any common thermoplastic material such as acrylonitrile butadiene styrene or from any metal such as steel or zinc.

To accommodate different sized cables to which the adapter security keychain 10 can be clamped, a rubber insert 50, as shown in FIGS. 4A and 4B, can be inserted into each chamber 32 and 34 of the clamping assembly 30. The rubber insert 50 includes a channel 52 which can be sized to allow the clamping assembly 30 to securely clamp down onto different sized cables. A plurality of sets of inserts 50 having different sized channels 52 may be provided. For example, channel 52 of the rubber insert 50 can be sized to allow the clamping assembly 30 to securely clamp down on micro-cables 4 mm and smaller in diameter or the channel 52 of the rubber insert 50 can alternatively be sized to allow the clamping assembly 30 to securely clamp down on standard cables from 4 mm to 9 mm in diameter. If the cable is larger than 9 mm, then there is no need to use the insert 50 and the clamping assembly 30 can be used without the insert 50. A set of rubber inserts 50 may be provided with each keychain 10. When needed, the rubber inserts 50 are placed into both the left and right clamping chamber 32 and 34. When inserted, the set of rubber inserts 50 fit securely into the clamping chambers 32 and 34 and allow the clamping assembly 30 to fit tightly over any sized cable. Alternatively, the user has the option to size the inserts 50 to be able to slide the entire clamping assembly 30 up or down the HDMI cable 28. This would allow the entire adapter security keychain 10 to be slide down the HDMI cable 28 when not in use and then slid back up the HDMI cable 28 when the user needs to use an adapter. If the true diameter of the cable is known beforehand, a longitudinally split ferrite core could be created and each half placed into the clamping chambers 32 and 34. The clamping assembly 30 with a ferrite core would then be able to additionally provide electromagnetic shielding and choking functions normally associated with the molded versions of pre-existing ferrite cores.

Figure 5A:
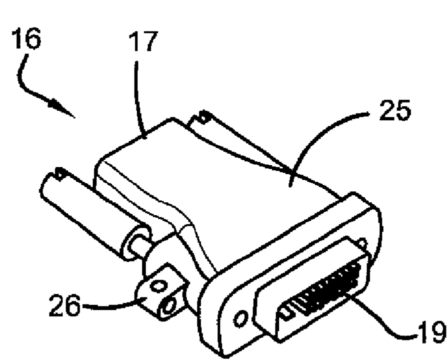
FIG. 5A is a perspective view of the DVI-D to HDMI adapter which can be used with the adapter security system of the present invention.
Figure 5B:
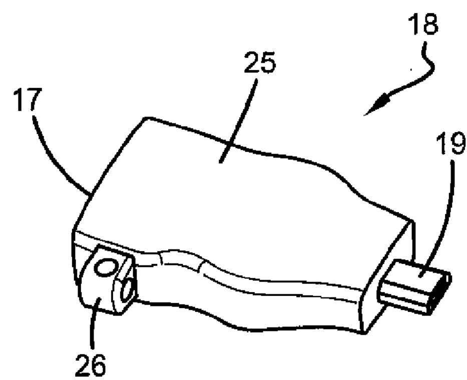
FIG. 5B is a perspective view of the Micro-HDMI to HDMI adapter which can be used with the adapter security system of the present invention.
Figure 5C:
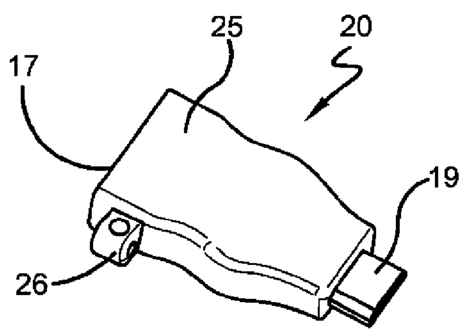
FIG. 5C is a perspective view of the Mini-HDMI to HDMI adapter which can be used with the adapter security system of the present invention.
Figure 5D:
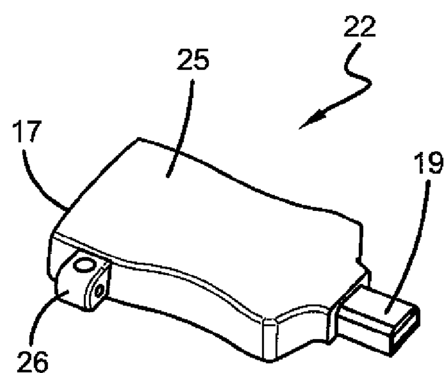
FIG. 5D is a perspective view of the Mini-DisplayPort to HDMI adapter which can be used with the adapter security system of the present invention.
Figure 5E:
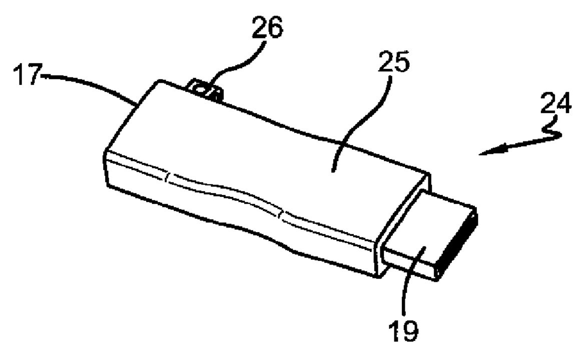
FIG. 5E is a perspective view of the DisplayPort to HDMI adapter which can be used with the adapter security system of the present invention.

A multitude of different adapters can be made to be received onto the adapter security keychain 10. FIGS. 5A through FIG. 5E show some of the different adapters that can be utilized. FIG. 5A shows a DVI-D to HDMI adapter 16 having a female end 17 and a male end 19, FIG. 5B shows a Micro-HDMI to HDMI adapter 18 having a female end 17 and a male end 19, FIG. 5C shows a Mini-HDMI to HDMI adapter 20 having a female end 17 and a male end 19, FIG. 5D shows a Mini-DisplayPort to HDMI adapter 22 having a female end 17 and a male end 19, and FIG. 5E shows a DisplayPort to HDMI adapter 24 having a female end 17 and a male end 19. Other possible adapters that could be utilized are a VGA to HDMI adapter, a MNL to HDMI adapter, and a USB to HDMI adapter. All adapters shown in FIGS. 5A through FIG. 5E currently utilize a female end 17 in the form of a female HDMI end; however other female ends such as a VGA or DisplayPort female end could also be used.

These types of adapters are currently known in the art, however, as shown in FIGS. 5A through FIG. 5E, each adapter is provided with an molded cover 25. Each cover 25 is molded with an eyelet 26 to permit attachment of each adapter to the security wire 12. Although each cover 25 is shown with a 4-way eyelet, it also contemplated that each cover 25 could also be molded with a 2-way eyelet, however, the -way eyelet provides for a more flexible arrangement when each adapter is placed onto the security wire 12. The cover 25 is molded with polyvinyl chloride and in the alternative; the cover 25 could also be molded with acrylonitrile butadiene styrene.

Figure 7:
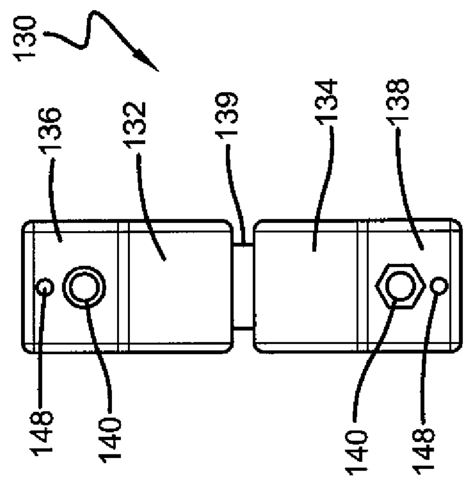
FIG. 7 is a top plan view of the adapter clamping assembly of the present invention used for adding additional adapters and shown in an open position.

If a user of the adapter security keychain 10 wishes to add additional adapters once the clamping assembly 30 has been locked, an installer has the ability to unlock the clamping assembly 30, open the security wire 12, and thread new adapters onto the security wire 12 as needed. Once the new adapters are added, the installer will then again go about closing the security wire 12 by means of the retaining ring 14 and finally locking the clamping assembly 30. Additionally, a user will have the ability to add an adapter to the security keychain 10 even if the adapter does not have the molded cover 25 of the present invention. To add such an adapter, a user could use an adapter clamping assembly 130, as shown in FIG. 7.

The adapter clamping assembly 130 includes a left and right opposed clamping chambers 132 and 134, a left and right locking end 136 and 138 extending from chambers 32 and 34, respectively, a hinge 139 connecting chambers 32 and 34, two screw apertures 140, one on each of the locking ends 136 and 138, and two security wire apertures 148, one on each of the locking ends 136 and 138. The connecting hinge 139 connects the left and right clamping chambers 132 and 134 and, when in use, the right clamping chamber 134 rotates at the connecting hinge 39 to clamp an adapter that does not have the molded cover 25 of the present invention, and to connect to the left clamping chamber 132.

The adapter clamping assembly 130 will also be able to use the rubber inserts 50 as shown in FIGS. 4A and 4B is needed. Accordingly, if a user needs to add an adapter that does not have the cover 25 to the security keychain 10, the installer will feed the security wire 12 through the security wire apertures 148 of the adapter clamping assembly 130 so as to attach the adapter clamping assembly 130 to the security wire 112. The adapter clamping assembly 130 is then secured to the adapter with a set of pin drive screws and associated nuts through the screw apertures 140 on the locking ends 136 and 138 of the adapter clamping assembly 130, similarly to how the clamping assembly 30 is attached to the HDMI cable 28 as shown in FIG. 2

Figure 6:
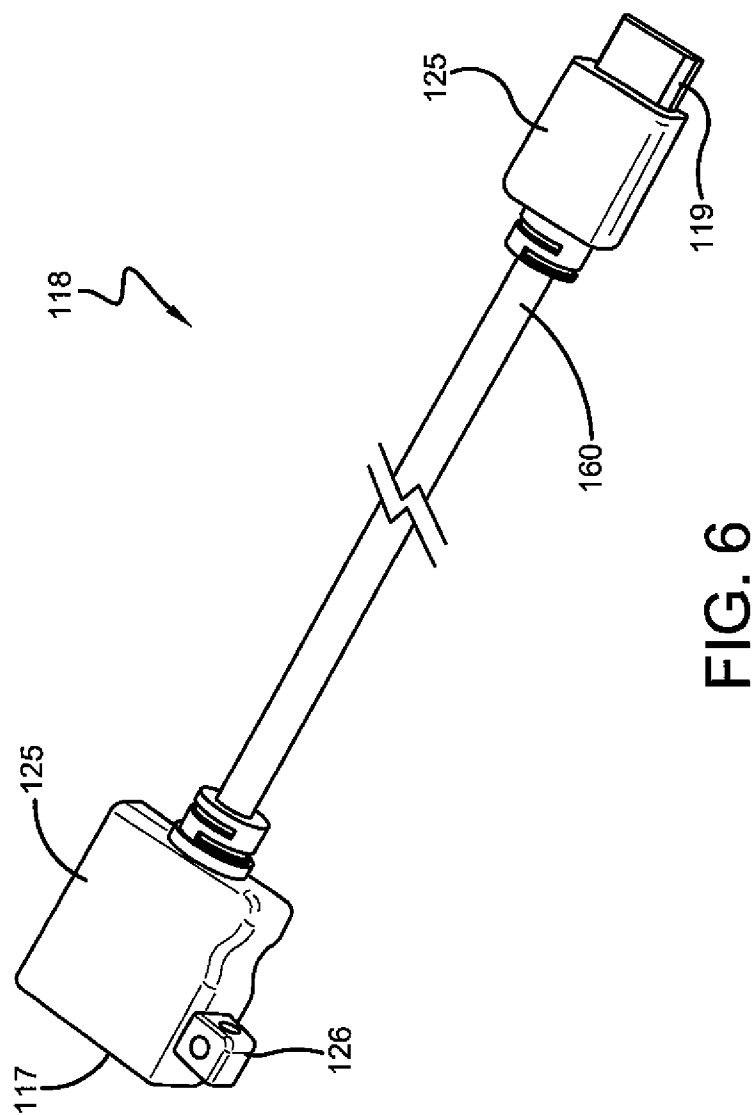
FIG. 6 is a perspective view of another embodiment of the Micro-HDMI to HDMI adapter shown in FIG. 5B which can be used with the adapter security system of the present invention.

FIG. 6 shows an alternative embodiment for a Micro-HDMI to HDMI adapter. The Micro-HDMI to HDMI adapter 118 has a female end 117 and a male end 119. The female end 117 shown is in the form of a female HDMI end. Located between the female HDMI end 117 and the male end 119 is a length of cable 160. The length of cable 160 located between the female HDMI end 117 and the male end 119 allows for a more flexible arrangement of the adapters 118 onto the security wire 12. Both the male end 119 and the female end 117 of the adapters shown in FIG. 6 are also provided with a molded cover 125. The female end 117 of the Micro-HDMI to HDMI adapter 118 is also molded with an eyelet 126 to permit attachment of the Micro-HDMI to HDMI adapter 118 to the security wire 12. The cover 125 is molded with polyvinyl chloride and in the alternative; the cover 125 could also be molded with acrylonitrile butadiene styrene. The alternative embodiment shown in FIG. 6 can also be used to create any of the adapters discussed in this application.

In light of the foregoing, it should be appreciated that the present invention significantly advances the art by providing a adapter security keychain that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An adapter security system adapted to be attached to a cable comprising:

a wire, at least one adapter carried by said wire, and a clamping assembly, separate and distinct from said wire, adapted to attach said wire to the cable, wherein said clamping assembly includes opposed clamping chambers, and wherein there is at least one aperture located on at least one of said clamping chambers to secure said wire.

2. The system of claim 1, wherein said adapter is provided with a cover having an eyelet to receive said wire.

3. The system of claim 1, wherein said clamping assembly includes a connecting hinge between said clamping chambers, and locking ends extending from said clamping chambers adapted to engage each other to engage the cable.

4. The system of claim 3, wherein each said locking end includes screw apertures.

5. The system of claim 3, wherein a locking lug is located on one of said locking ends and a locking groove is located on the other of said locking ends.

6. The system of claim 3, wherein the at least one aperture to secure said wire is located on the locking end of the at least one of said clamping chambers.

7. The system of claim 3 further comprising at least one insert sized to fit within said clamping chambers.

8. The system of claim 1, wherein the at least one adapter includes a male end and the female end, and a length of cable extending between said ends.

9. An adapter security system adapted to be attached to a cable comprising:

a wire, wherein the wire has a first end and a second end, at least one adapter carried by said wire, a clamping assembly, separate and distinct from said wire, adapted to attach said wire to the cable, wherein said clamping assembly includes opposed clamping chambers, and wherein there is at least one aperture located on at least one of said clamping chambers to secure said wire, and a retaining ring to connect the first end and second end of the wire.

10. The system of claim 9, wherein the clamping assembly is adapted to receive said retaining ring.

11. A method of securing adapters to a cable at a workstation comprising the steps of:

attaching at least one adapter onto a wire;

attaching a clamping assembly onto the wire by stringing the wire through apertures in the clamping assembly;

placing the cable from the workstation within the confines of opposed clamping chambers of the clamping assembly; and closing the clamping assembly to retain the cable.

12. The method of claim 11, further comprising the steps of forming a cover around the at least one adapter, the cover having an eyelet.

13. The method claim 12, wherein said step of attaching the at least one adapter to the wire includes the step of stringing the wire through the eyelet of the at least one adapter.

14. The method of claim 11, wherein the step of closing the clamping assembly to retain the cable includes the step of locking the clamping assembly together with a screw and nut assembly.

15. The method of claim 11, further comprising the step of placing at least one rubber insert within the confines of the clamping assembly prior to the placing of the cable step.

16. A clamp adapted to engage a cable comprising:

clamping chambers, a connecting hinge between said clamping chambers, at least one removable insert sized to fit within said clamping chambers, wherein said at least one insert includes a channel adapted to receive the cable, and locking ends extending from said locking chambers adapted to engage each other to engage the cable.

17. The clamp of claim 16, wherein each said locking end includes screw apertures.

18. The clamp of claim 16, wherein a locking lug is located on one of said locking ends and a locking groove is located on the other of said locking ends.

19. The clamp of claim 16, further comprising at least one wire aperture located on at least one of said locking ends to secure a wire.

* * * * *